United States Patent
Jacobsen et al.

(10) Patent No.: US 7,280,804 B2
(45) Date of Patent: Oct. 9, 2007

(54) CHANNEL ADAPTATION USING VARIABLE SOUNDING SIGNAL RATES

(75) Inventors: Eric A. Jacobsen, Scottsdale, AZ (US); Shahrnaz Azizi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 10/769,414

(22) Filed: Jan. 30, 2004

(65) Prior Publication Data

US 2005/0170781 A1    Aug. 4, 2005

(51) Int. Cl.
*H04B 17/00* (2006.01)

(52) U.S. Cl. .................. 455/67.11; 455/452.2; 370/235

(58) Field of Classification Search ............. 455/67.11, 455/452.2, 561, 68, 69; 370/235, 329; 375/260
See application file for complete search history.

(56) References Cited

U.S. PATENT DOCUMENTS

| | | | |
|---|---|---|---|
| 6,697,640 B1 * | 2/2004 | Katz et al. ................. | 455/561 |
| 2003/0086371 A1 * | 5/2003 | Walton et al. .............. | 370/235 |
| 2003/0123559 A1 * | 7/2003 | Classon et al. ............ | 375/260 |

FOREIGN PATENT DOCUMENTS

DE    101 41 971 A1    3/2003

OTHER PUBLICATIONS

L. Hanzo et al., "OFDM and MC-CDMA for Broadband Multi-User Communications, WLANs and Broadcasting", Jan. 1, 2003, pp. 164-165 and 196-198.

* cited by examiner

*Primary Examiner*—Sanh D. Phu
(74) *Attorney, Agent, or Firm*—Pearl Cohen Zedek Latzer, LLP

(57) ABSTRACT

Systems, devices and methods for updating link adaptations in multi-carrier modulated signals between an access point (AP) and a wireless local area network (WLAN) station (STA) include (are configured for) periodically transmitting a channel sounding signal from the AP. The STA receives each unsolicited channel sounding signal and evaluates the current channel conditions between the AP and STA. The AP adjusts a rate of transmission of the channel sounding signals in accordance with the channel coherence time so that the channel estimates performed by the STA will be valid within the time varying characteristics of the channel. Depending on the length of the coherence time for network environment, the channel sounding signals may be AP beacons, low overhead signal fragments with no payload, or a combination of both.

16 Claims, 4 Drawing Sheets

CHANNEL ADAPTATION USING VARIABLE SOUNDING SIGNAL RATES

BACKGROUND OF THE INVENTION

The present invention relates to communications in wireless networks. More specifically, but not exclusively, the present invention relates to signaling techniques for adaptively modulating communications in a high throughput wireless network.

Most communications networks are designed to convey multiple communications simultaneously over each individual communication path, for example, a radio frequency (RF) channel, using some type of modulation. In recent years, an increasing demand has arisen for more efficient and reliable digital data transfers which assure correct data transmissions at as high a data rate as possible.

Orthogonal frequency division multiplexing (OFDM) is an increasingly attractive modulation technique for high-bandwidth wireless applications since it dramatically simplifies equalization of intersymbol interference (ISI) channels. Using link adaptation (LA), it is possible to improve throughput and/or efficiency in wireless OFDM systems by adjusting transmission parameters, such as subcarrier modulation orders, power allocation and/or code rate, to best fit the current channel state.

Ideally, link adaptation would adapt at every time instant in frequency to the instantaneous channel realizations. Unfortunately, limitations in feedback bandwidth and variation of the channel due to Doppler spread make ideal link adaptation difficult to realize.

One of the difficulties encountered in LA for wireless networks, for example, high throughput (HT) wireless local area networks (WLANs) with adaptive OFDM, is the useful duration of channel adaptation information. Since propagation channels can change rapidly due to Doppler and other effects, the useful duration of channel adaptation information may be dependent on the coherence time of the channel. Coherence time is the time domain dual of Doppler spread (i.e., Doppler spread and coherence time are inversely proportional to one another) and is used to characterize the time varying nature of the frequency dispersivenes of a channel in the time domain.

Coherence time is a statistical measure of the time duration over which the channel impulse response is essentially invariant, and quantifies the similarity of the channel response at different times. In other words, it is the time duration over which two received signals have a strong potential for amplitude correlation. Network environments with long channel coherence times may not need as frequent channel adaptations as network environments with shorter channel coherence times. Thus the channel adaptation information for longer channel coherence times may be exchanged on a proportionately less frequent basis. Conversely, networks in highly dynamic environments may need to exchange adaptation information more often in order to maximize the efficiency of the channel adaptations. A method, system and/or technique for efficient link adaptation between communicating devices is needed.

BRIEF DESCRIPTION OF THE DRAWING

Aspects, features and advantages of the present invention will become apparent from the following description of the invention in reference to the appended drawing in which like numerals denote like elements and in which.

DETAILED DESCRIPTION OF THE INVENTION

While the following detailed description may describe example embodiments of the present invention in relation to wireless networks utilizing Orthogonal Frequency Division Multiplexing (OFDM) adaptive modulation, the embodiments of present invention are not limited thereto and, for example, can be implemented using other modulation schemes which may utilize link adaptation information where suitably applicable.

The following inventive embodiments may be used in a variety of applications including transmitters and receivers of a radio system, although the present invention is not limited in this respect. Radio systems specifically included within the scope of the present invention include, but are not limited to: wireless local area network (WLAN) systems, wireless personal area networks (WPAN) systems, wide metropolitan area network (WMAN) systems and wireless wide area network (WWAN) systems including network interface devices and peripherals such as network interface cards (NICs), base stations, access points (APs), gateways, bridges, hubs and cellular radiotelephones. Further, the radio systems within the scope of the invention may include cellular radiotelephone systems, satellite systems, personal communication systems (PCS), two-way radio systems, one-way pages, two-way pagers, personal computers (PC), personal digital assistants (PDA), personal computing accessories (PCA) and all existing and future arising systems which may be related in nature and two which the principles of the invention could be suitably applied.

Figure 1:
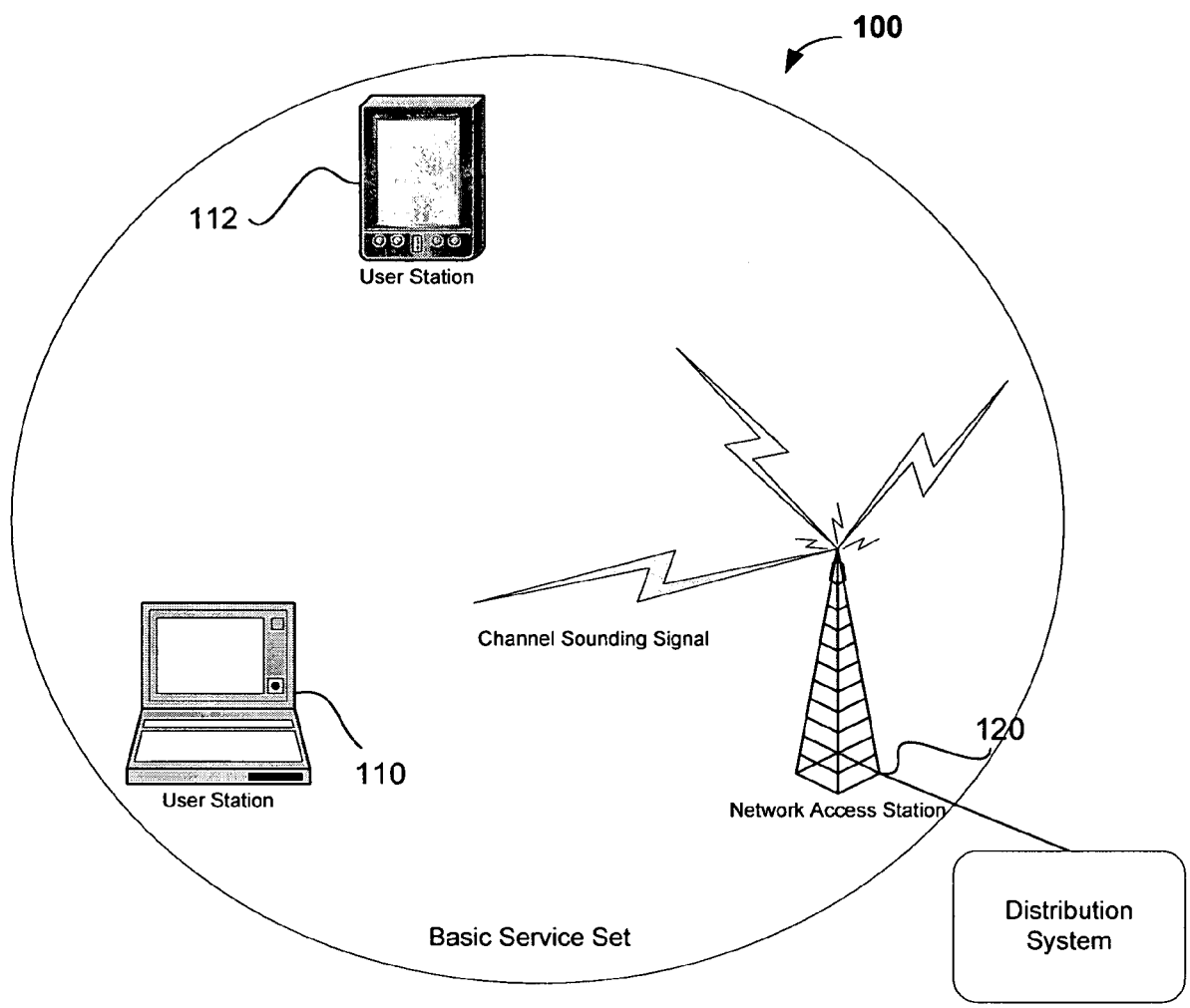
FIG. 1 is a block diagram of an exemplary communication system according to various embodiments of the present invention.

Turning to FIG. 1, a wireless communication system 100 according to one of the embodiments of the invention may include one or more user stations 110, 112 and one or more network access stations 120. System 100 may be any type of wireless network such as a wireless local area network (WLAN), wireless wide area network (WWAN) or cellular network where stations 110, 112 communicate with access station 120 via a communication link or channel. System 100 may further include one or more other wired or wireless network devices as desired, for example basic services set (BSS), distribution system (DS) and/or ad-hoc network components.

The communication channel conditions between stations 110, 112 and 120 may be measured and/or estimated so that communications between these stations can be continually adapted (if necessary) to facilitate efficient communications with reasonable quality.

In preferred embodiments system 100 is an adaptive OFDM network although the embodiments of the invention are not limited in this respect. OFDM is the modulation currently used in many wireless applications including the Institute of Electrical and Electronic Engineers (IEEE)

802.11a and 802.11g standards for WLANs. OFDM works by dividing up a wideband channel into a larger number of sub-channels. By placing a subcarrier in each sub-channel, each subcarrier may be modulated separately depending on the signal to noise ratio (SNR) or other signal characteristics in that particular narrow portion of the band. As the channel varies over time, adaptations can be made on each subcarrier in order to continually optimize the data-carrying capacity of the channel. This is referred to herein as "adaptive modulation." Alternate and/or additional transmission parameters, such as subcarrier power allocation and/or code rates, may also be adapted or modified to improve the efficiency of communications. The various types of transmission adaptations are generically, individually and/or collectively, referred to herein as "link adaptation" (LA).

Since the channel conditions are susceptible to change due to, for example, reflections, interference, scattering or movement between stations, the channel conditions should be continually evaluated so that transmission parameters can be modified to meet current or recent channel conditions.

A relatively simple way to determine the channel conditions and/or whether a previous link adaptation scheme has expired (i.e., lost its usefulness due to changes in the channel) is to exchange training preambles and adaptation information between the user station 110, 112 and the network access station 120 at every access. This approach provides the freshest link adaptations but incurs a large overhead since it uses a dedicated exchange between the stations to update the link adaptation.

Another approach is for user station 110, 112 to passively measure/estimate the channel conditions in the downlink direction based on channel sounding signals broadcast from access station 120. A channel sounding signal is a transmission which may be used by proximate receivers to estimate current channel conditions whether or not they are actively communicating with access station 120.

In example implementations of the present invention relating to WLAN, a channel sounding signal might be a periodic access beacon transmission from an access point (AP) (e.g., network access station 120) or ad-hoc station. Access beacons, generically referred to herein as AP beacons, are unsolicited broadcasts that are periodically repeated so that proximate network stations (STAs) may detect the existence of and/or properties of the network access station for acquisition purposes and/or link maintenance. In one example, received AP beacon transmissions (i.e., in the downlink direction) can be used by user stations 110, 112 to periodically sense and track the channel conditions and/or identify any significant changes in the channel condition. User stations 110, 112 may then resynchronize with, and/or adapt subsequent transmission parameters to, the access station 120 (i.e., in the uplink direction) based on channel conditions of the detected AP beacons (i.e., in the downlink direction).

However, if the period between AP beacons (and/or other types of unsolicited broadcasts such as communications between the AP and another STA) is longer than the channel coherence time, the channel conditions estimated by user stations 110, 112 for the last access beacon may no longer be valid for communications occurring a certain time (e.g., the coherence time) after the last access beacon. Accordingly, in certain embodiments of the present invention, the beacon rate of network access station 120 (or the interval between periodic channel sounding signals) may be varied in proportion to a channel coherence time in order to allow a user station 110 to passively detect changes in the channel conditions. Once changes are detected, the user station 110 may adapt future uplink communications to access station 120 and/or send training information to access station 120 to facilitate its link adaptation.

The network access station may be adjusted to beacon at a slower or faster rate to meet the link adaptation requirements of the network and preferably, the period between beacons will not substantially exceed the channel coherence time. In this manner the network access station and user station may exchange training information (i.e., update the link adaptation scheme), only when the user station determines that the channel conditions have changed from observing channel sounding signals in the downlink direction.

If the channel coherence time is relatively short, it may be inefficient to increase the AP beacon rate too much since AP beacons may include additional overhead other than just a training preamble. Such additional overhead may include information to identify the network for example, service set identifier (SSID), supported rate/mode, supported security mechanisms, etc. which may not be needed for link adaptation. In cases with relatively shot channel coherence times, network access station 120 (e.g., an AP or ad-hoc station) may be configured to transmit a different type of channel sounding signal (i.e., other than an AP beacon) so that an interval between any two successive sounding signals does not significantly exceed the channel coherence time.

These additional channel sounding signals may be used exclusive of, or in addition to, the access beacons so that the channel conditions between stations can be estimated and link adaptations can be implemented (if necessary) in a period proportional to the channel coherence time. In certain embodiments the channel sounding signals may be low overhead signal fragments, such as a training preamble without a data payload. In combination with, or exclusive of, the access beacons, the time period between successive channel sounding signals may be varied in accordance with the channel coherence time. This type of dynamic adjustment allows user stations 110, 112 to maintain adaptation coherence tracking without actively sounding the channel and without incurring the full overhead of, for example, the AP 120 transmitting closely spaced AP beacons.

Figure 2:
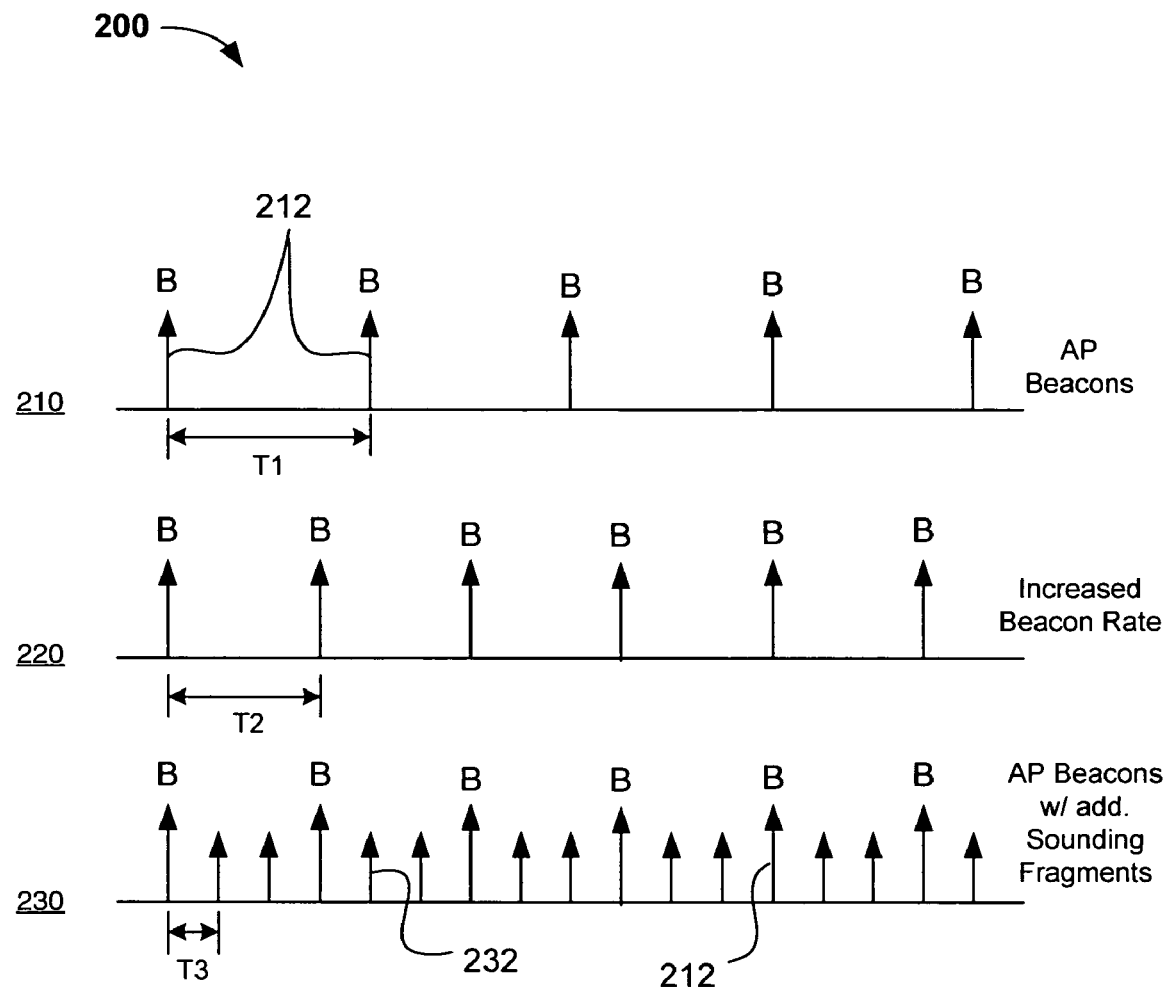
FIG. 2 is a timing diagram showing various rates of channel sounding signals in proportion to the channel coherence times in a communications network according to one example embodiment of the present invention.

Turning to FIG. 2, an example timing diagram 200 illustrates sample varying timing sequences 210, 220 and 230 for transmitting channel sounding signals according to various embodiments of the present invention.

Timing sequence 210 demonstrates a transmitting unit (e.g. AP) in a network environment with a long coherence time. The AP transmits beacons 212 at every time interval T1, referred to as the beacon rate. Interval T1 may preferably have a maximum length selected to conserve power and utilize the minimum channel bandwidth but shorter than a coherence time of the channel.

Timing sequence 220 demonstrates beacons 212 being transmitted at shortened time intervals T2. In this example, interval T2 is reduced (as compared with T1) to increase the access beacon rate for a network environment having a shorter channel coherence time as compared with the coherence time for timing sequence 210.

However, as previously mentioned, it may be undesirable to increase the access beacon rate too much since; for example, an AP beacon may carry additional overhead other than a training preamble. Timing sequence 230 demonstrates an optional embodiment for environments with relatively short channel coherence times. Here, the network access station may sound the channel using beacons 212 which occur at some maximum rate (e.g., every interval T2). However, additional sounding fragments 232, having lower overhead (reflected by shorter arrows) than typical AP beacons, may be transmitted in the interval between beacons 212. This embodiment allows the user stations to track channel conditions without the overhead associated with frequent beacons.

Depending on the channel coherence time, the network access station may transmit more than one sounding fragment 232 between each access beacon 212, and such that a time interval T3 between any two successive transmissions (e.g., between beacon and sounding fragment or two sounding fragments) will not substantially exceed the coherence time of the channel.

Figure 3:
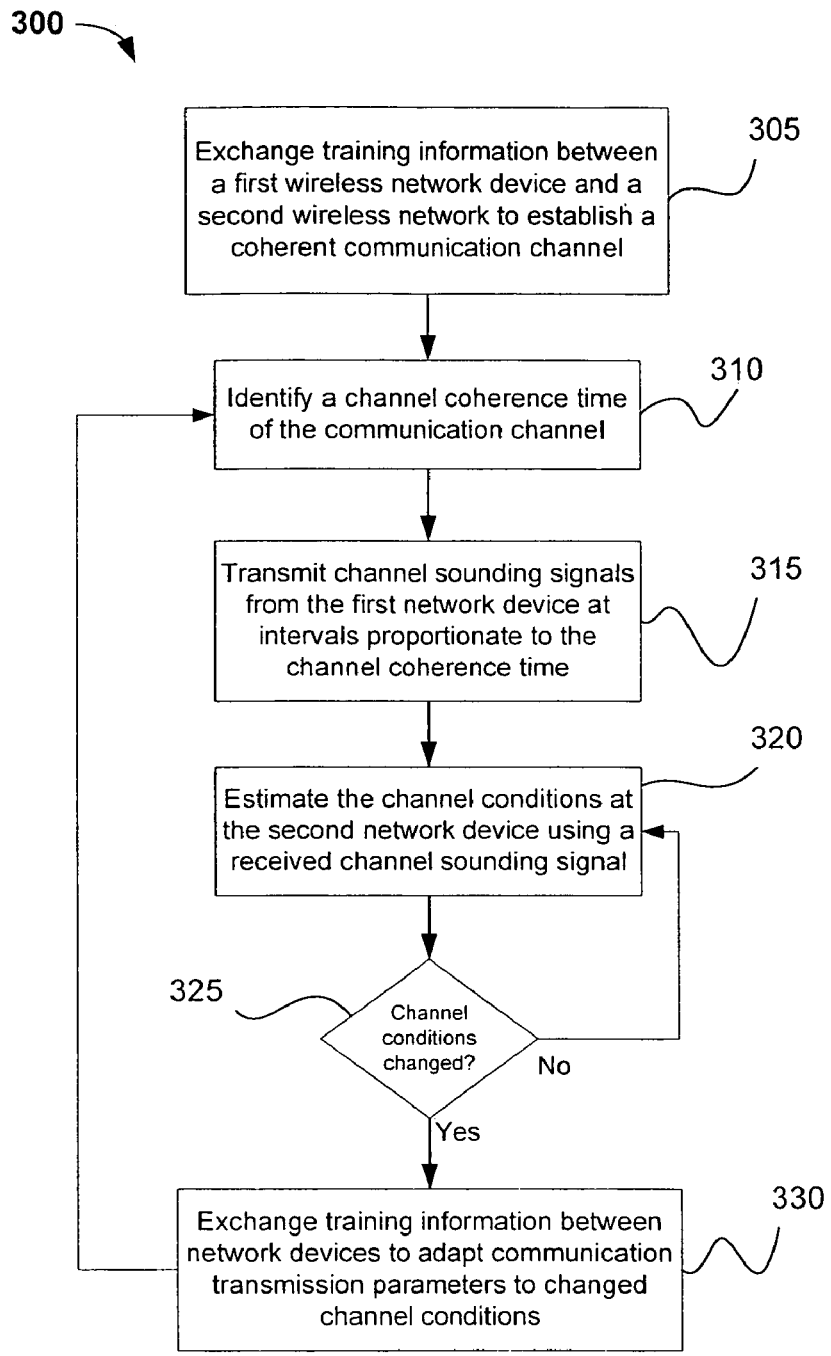
FIG. 3 is a sequence diagram showing a method of varying sounding signal rates according to one embodiment of the present invention.

Turning to FIG. 3, a method 300 of communicating in an adaptive link wireless network according to certain embodiments of the invention generally includes wireless devices exchanging 305 (e.g., at least one device sending information to the other) training information to establish a communication channel in a wireless network. In one embodiment, one or both of the wireless devices send training symbols or pilot signals to the other in an attempt to synchronize and establish a coherent adaptive OFDM communication channel.

The devices may receive the training information and estimate the characteristics of the channel for adapting OFDM transmission parameters, including determining 310 the channel coherence time. Once the channel coherence time is known/estimated, one of the wireless devices (e.g., an AP) can then periodically broadcast 315 channel sounding signals (e.g., an AP beacon, low-overhead signal fragments or combination thereof) at intervals proportionate to the channel coherence time. The device not transmitting channel sounding signals, may then periodically receive each channel sounding signal and estimate 320 the channel conditions to passively determine 325 if any significant changes have occurred in the channel.

If any significant changes in the channel are identified, one or both of the devices may then exchange 330 additional training information so that both devices may update, if necessary, their adaptive OFDM transmission parameters (e.g., modulation scheme, power allocation, etc.) in accordance with the new channel conditions.

Figure 4:
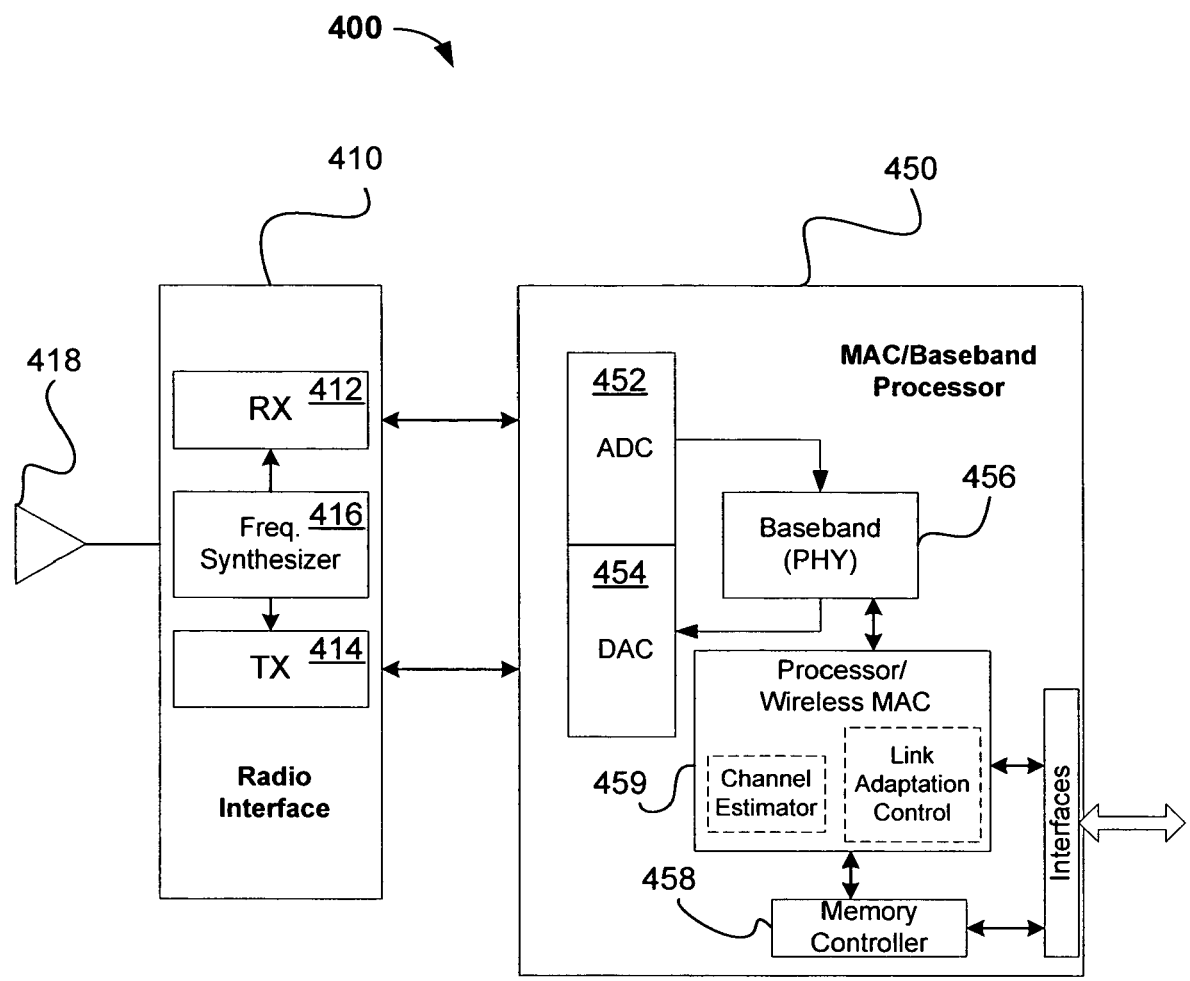
FIG. 4 is a block diagram of a communication apparatus which uses varying sounding signal rates according to one embodiment of the present invention.

Turning to FIG. 4, an example network apparatus 400 which may implement the various embodiments of the present invention generally includes a radio frequency (RF) interface 410 and a baseband and medium access controller (MAC) processor portion 450.

RF interface 410 may be any component or combination of components operative to send and receive multi-carrier modulated signals. In one example RF interface includes a receiver 412, transmitter 414 and frequency synthesizer 416. Interface 410 may also include bias controls and a crystal oscillator and/or one or more antennas 418. Furthermore, RF interface 410 may alternatively or additionally use external voltage-controlled oscillators (VCOs), surface acoustic wave filters, IF filters and/or RF filters. Various RF interface designs and their operation are known in the art and the description thereof is therefore omitted.

In preferred embodiments interface 410 is configured to be compatible with one or more of the Institute of Electrical and Electronics Engineers (IEEE) 802.11 frequency band standards for wireless local area networks (WLAN), however European or other standards may also apply. Most preferably, interface 410 is configured for compatibility and/or backward compatibility with the IEEE 802.11 (*a-b*) (*g*) and/or (*n*) standards for WLAN.

Baseband and MAC processing portion 450 communicates with RF interface 410 to process receive/transmit signals and may include, by way of example only, an analog-to-digital converter 452 for down converting received signals, a digital to analog converter 454 for up converting signals for transmission, a baseband processor 456 for physical (PHY) layer processing of respective receive/transmit signals, and one or more memory controllers 458 for managing read-write operations from one or more internal and/or external memories (not shown). Processing portion 450 may also include processor 459 for medium access control (MAC)/data link layer processing. In certain embodiments of the present invention, processor 459 or additional circuitry (not shown) may be configured to perform the processes for identifying channel coherence time, adjusting the rate of channel sounding signals and/or channel estimation (e.g., 310, 315, or 320; FIG. 3). Alternatively or in addition, baseband processor 456 may share processing for these functions or perform these processes independent of processor 459. MAC and PHY processing may also be integrated into a single component if desired.

Apparatus 400 may be implemented as, for example, a user station (STA) or as an access point (AP) described previously and the functions and/or specific configurations of apparatus 400 would be suitably selected or omitted.

The components and features of apparatus 400 may be implemented using any combination of discrete circuitry, application specific integrated circuits, logic gates and/or single chip architectures. Further, the features of apparatus 400 may be implemented using microcontrollers, programmable logic arrays and/or microprocessors or any combination of the foregoing where suitably appropriate.

It should be appreciated that the example apparatus 400 shown in the block diagram of FIG. 4 is only one functionally descriptive example of many potential implementations and that division, omission or inclusion of block functions in FIG. 4 does not infer that the hardware components, circuits and/or elements for implementing these functions would be divided, omitted, or included in embodiments of the present invention.

Embodiments of the present invention may be implemented using single input single output (SISO) systems, multiple input multiple output (MIMO) systems or any combination thereof. Further, embodiments of the invention may utilize multi-carrier code division multiplexing (MC-CDMA) multi-carrier direct sequence code division multiplexing (MC-DS-CDMA) or any other existing or future arising modulation or multiplexing scheme compatible with the features of the present invention.

Unless contrary to physical possibility, the inventors envision the methods described herein: (i) may be performed in any sequence and/or in any combination; and (ii) the components of respective embodiments combined in any manner.

Although there have been described preferred embodiments of this novel invention, many variations and modifications are possible without departing from the scope of the invention and the embodiments described herein are not limited by the specific disclosure above, but rather should be limited only by the scope of the appended claims and their legal equivalents.

The invention claimed is:

1. A method of communicating between a first station and a second station in a link adaptive wireless network, the method comprising:

transmitting one or more sounding fragments between access beacons, said one or more sounding fragments comprising a training preamble with no payload, from the first station to be used by the second station to evaluate a channel condition between the first station and the second station; and adjusting a rate of transmission of the access beacons based on a channel coherence time of the communication channel between the first station and the second station.

2. The method of claim 1, wherein communicating between the first station and the second station in the link adaptive wireless network comprises using orthogonal frequency division multiplexing (OFDM) with adaptive bit modulation.

3. The method of claim 1, wherein communicating between the first station and the second station in the link adaptive wireless network comprises using OFDM with adaptive subcarrier power loading.

4. A communication system comprising:

a transmitter; and a control unit communicatively coupled to the transmitter and operative to control the transmitter to transmit, on a communication channel, channel sounding signals at intervals corresponding to a channel coherence time of the communication channel and one or more channel sounding fragments having lower overhead than the channel sounding signals between the intervals of the channel sounding signals.

5. The system of claim 4 wherein the transmitter transmits orthogonal frequency division multiplexing (OFDM) signals.

6. The system of claim 4 wherein the channel sounding signals comprise acesses beacons.

7. The system of claim 4 further comprising an antenna coupled to the transmitter and operative to broadcast multicarrier signals.

8. The system of claim 4 wherein the transmitter and control unit comprise a wireless lacal area network access point (WLAN AP).

9. A wireless communication device comprising:

a channel estimator configured to estimate a condition of a communication channel with a remote device based on received channel sounding signals periodically broadcast by the remote device at an interval corresponding to a coherence time of the communication channel and one or more channel sounding fragments having lower overhead than the channel sounding signals between the intervals of the channel sounding signals; and a control unit configured to adapt communications with the remote device according to detected changes in the condition of the communication channel.

10. The device of claim 9 wherein the device comprises a wirless local area (WLAN) station (STA).

11. The device of claim 9 wherein the wireless communication device and the remote device communicate using orthogonal frequency division multiplexing (OFDM) signals.

12. The device of claim 9 wherein the channel sounding signal comprises a signal fragment having a training preamble with no data payload.

13. The device of claim 9 wherein the channel sounding signal comprises an acesses beacon.

14. The device of claim 9 wherein the remote device comprises an acesses point (AP).

15. The device of claim 11 further comprising an antenna configured to broadcast and receive the OFDM signals.

16. The device of claim 11 further comprising multiple antennas configured to broadcast and receive the OFDM signals.

* * * * *